United States Patent
Kushwah

(10) Patent No.: US 8,560,786 B2
(45) Date of Patent: Oct. 15, 2013

(54) EFFICIENT USE OF MEMORY AND ACCESSING OF STORED RECORDS

(75) Inventor: Ajay Pratap Singh Kushwah, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 321 days.

(21) Appl. No.: 12/658,561

(22) Filed: Feb. 8, 2010

(65) Prior Publication Data

US 2010/0153651 A1 Jun. 17, 2010

Related U.S. Application Data

(62) Division of application No. 11/473,485, filed on Jun. 23, 2006, now Pat. No. 7,694,103.

(51) Int. Cl.
*G06F 13/00* (2006.01)
*G06F 13/28* (2006.01)

(52) U.S. Cl.
USPC .................. 711/162; 711/118; 711/E12.103; 707/674; 712/207

(58) Field of Classification Search
USPC .................. 711/162, 118, E12.103; 707/674; 712/207
See application file for complete search history.

(56) References Cited

U.S. PATENT DOCUMENTS

| | | | | |
|---|---|---|---|---|
| 7,370,153 B1* | 5/2008 | Danilak | ......................... | 711/137 |
| 2007/0185934 A1* | 8/2007 | Cannon et al. | ................ | 707/204 |

* cited by examiner

*Primary Examiner* — Edward Dudek, Jr.
(74) *Attorney, Agent, or Firm* — Van Pelt, Yi & James LLP

(57) ABSTRACT

Memory is used, including by receiving at a processor an indication that a first piece of metadata associated with a set of backup data is required during a block based backup and/or restore. The processor is used to retrieve from a metadata store a set of metadata that includes the first piece of metadata and one or more additional pieces of metadata included in the metadata store in an adjacent location that is adjacent to a first location in which the first piece of metadata is stored in the metadata store, without first determining whether the one or more additional pieces of metadata are currently required. The retrieved set of metadata is stored in a cache.

18 Claims, 13 Drawing Sheets

Metadata Table

|  | File size | Permissions | Block location |
|---|---|---|---|
| Inode 1 |  |  |  |
| Inode 2 |  |  |  |
| Inode 3 |  |  |  |
| Inode 4 |  |  |  |

FIG. 2A

EFFICIENT USE OF MEMORY AND ACCESSING OF STORED RECORDS

CROSS REFERENCE TO OTHER APPLICATIONS

This application is a divisional of co-pending U.S. patent application Ser. No. 11/473,485 entitled EFFICIENT USE OF MEMORY AND ACCESSING OF STORED RECORDS filed Jun. 23, 2006 now U.S. Pat. No. 7,694,103 which is incorporated herein by reference for all purposes.

BACKGROUND OF THE INVENTION

In some block based backup systems, files or other data objects are backed up by storing blocks associated with the data objects being backed up. Blocks and associated metadata are updated as needed and are retrieved in the event a file or other data object is restored. During restoration, blocks and other information (e.g., an inode number associated with files being restored and/or physical locations of blocks associated with those files) are retrieved from backup media or other memory. For example, for each file to be restored in some systems a file name is mapped to an inode number, the inode number is used to identify blocks comprising the file and the location at which each block is stored on backup media, the blocks comprising the file are read from the backup media, and the blocks read from backup media are used to restore the file to the destination machine. Throughout a restoration process, a variety of information is stored in memory by various processes or agents running on the components of a block based backup system. Reading and/or writing information to memory may contribute to the amount of time a restoration requires. Some block based systems take hours to perform a restore, for example when restoring a large directory containing a million or more files. Reducing the amount of time to read/write to memory would be desirable, since this may reduce the overall amount of time required to perform a restoration.

BRIEF DESCRIPTION OF THE DRAWINGS

Various embodiments of the invention are disclosed in the following detailed description and the accompanying drawings.

FIG. 2A is a diagram illustrating an embodiment of a metadata table associated with block based backup.

DETAILED DESCRIPTION

Figure 1:
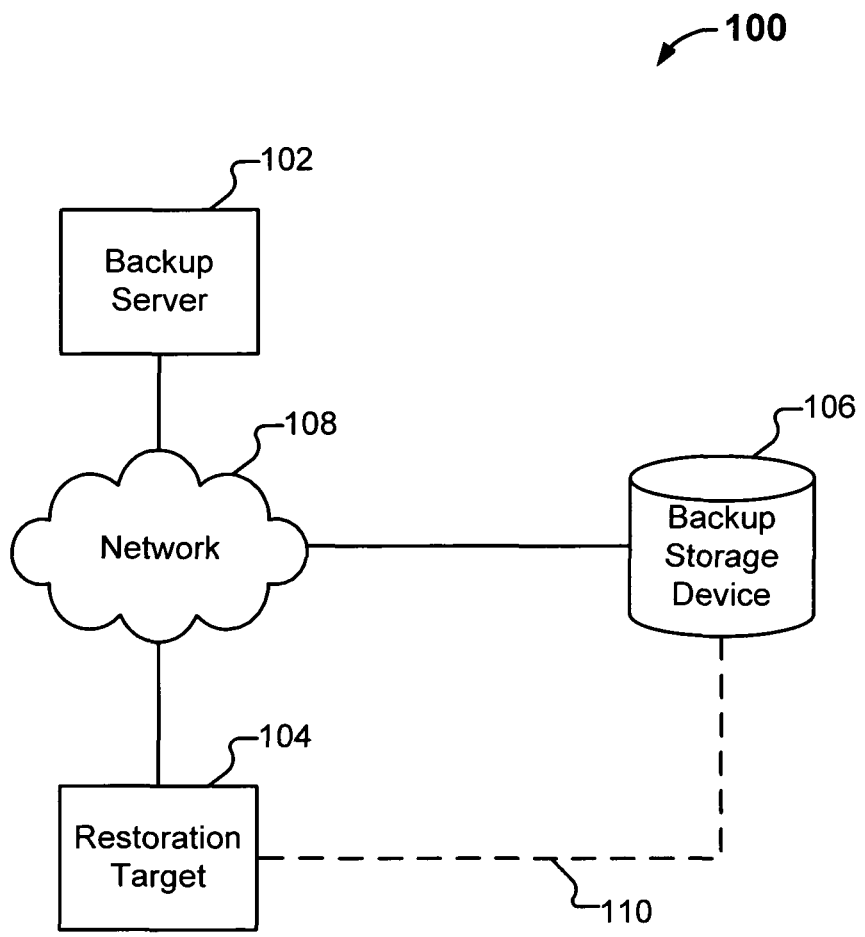
FIG. 1 is a system diagram illustrating an embodiment of a backup system.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using memory is disclosed. In some embodiments, a block of memory is obtained from a memory allocator. A first location in the block of memory may be sub-allocated to a first backup and/or restoration related task. For example, some or all of the memory obtained from the memory allocator is used for the first task. In some embodiments, a backup and/or restoration task is associated with a block based system, as opposed to a file based system. In a block based backup, blocks associated with files being backed up are written to backup media and blocks associated with a given file may be scattered throughout backup media (e.g., magnetic tape media). During a restore, blocks that are associated with the one or more files being restored are retrieved from the backup media. An indication is received that the first location is available to be sub-allocated to a subsequent backup and/or restoration related task, if any. For example, in some embodiments, a memory once allocated, e.g., to a backup related process, is reused to perform a series of backup tasks and is not necessarily released or returned after it is done being used for an initial task for which it was first requested to be allocated. For example, a memory may be used during a first period of time to store a first set of information (i.e., for a first task) and may be used during a second period of time to store a second set of information (i.e., for a second task).

In some embodiments, when retrieving a desired or needed piece of metadata from a metadata store, information in addition to the desired piece of information is retrieved without first determining whether the additional information is currently needed. The retrieved information, including the additional information, in some embodiments is stored in a cache, for example until it is requested. In some embodiments, when an indication is received that a particular piece of metadata is needed or desired, the cache is first checked to determine if that piece of metadata is stored in the cache. In some embodiments if a piece of metadata is stored in the cache, it is retrieved from the cache (e.g., as opposed to the metadata store).

FIG. 1 is a system diagram illustrating an embodiment of a backup system. In the example shown, backup system 100 stores data associated with one or more files (or other data objects) to back up those files. In some embodiments, backup server 102 performs backup related functionality such as managing data backup and managing the retrieval of stored data during restoration. In some embodiments, backup server 102 interacts with a client or other agent running on restoration target 104 and/or backup storage device 106 that is configured to communicate with backup server 102.

During a backup, backup server 102 in some embodiments determines appropriate data to store and passes this data to backup storage device 106 to be stored. In some embodiments, backup server 102 directs a client or agent to pass data to be saved directly to backup storage device 106. In some embodiments, backup server 102 manages the organization and controls where information is stored on backup storage device 106, for example by maintaining a table or list of stored information and corresponding physical locations on backup storage device 106. During a restore, in some embodiments backup server 102 receives, e.g., from restoration target 104, a list of files or other data objects to be restored to restoration target 104. To restore those files on restoration target 104, information associated with those files is retrieved from backup storage device 106 and passed to restoration target 104.

Backup storage device 106 includes backup media for storing information. Storage media associated with backup storage device 106 includes, for example, magnetic tape media, hard disk media, optical storage media, etc. In some embodiments, backup storage device 106 comprises multiple physical devices that are coupled to each other via a connection or network. In some embodiments, backup storage device 106 is associated with multiple restoration targets.

In some embodiments, block based backup is performed by storing on backup media multiple blocks of data associated with a particular file. For example, typically files stored on restoration target 104 are organized and accessed using a file system. Each file typically has a name or other identifier, and the files typically are organized hierarchically into one or more levels of directories. The data comprising a file is stored typically as a plurality of blocks of data on physical storage, such as a hard disk. Data is not necessarily stored in (for example) file offset order on physical storage. During a block based backup, the blocks comprising a file to be backed up, or in some cases those blocks that have changed since a previous backup, are copied and stored on backup media, such as backup storage device 106, which may comprise fixed storage such as one or more hard drives and/or removable media such as tape, optical disk storage, etc. In some embodiments, multiple files are backed up and each backed up file is associated with its own group of blocks (i.e., a given block is associated with at most one file). Blocks are stored on backup storage device 106. During a restore, blocks associated with the file(s) being restored are retrieved from backup storage device 106 and are used to restore the file(s). Some block based backup systems offer advantages or conveniences over non-block based backup systems (e.g., traditional file based backup systems). For example, in some block based backup systems only the blocks that have changed since the last backup backed up, a backup storage device is used more efficiently since smaller units of information are stored, etc. In some embodiments, blocks for a particular file are not necessarily stored next to each other on backup storage device 106 and blocks associated with different files may be intermingled. For example, if a file A comprises blocks A1, A2, and A3, and a file B comprises blocks B1 and B2, the blocks may be stored on backup media in the order A1-B1-A2-A3-B2. Blocks from still other files may also be intermingled with the ones in the preceding example, and/or empty blocks may exist where no backup data is currently stored.

Restoration target 104 in the example shown is the device on which one or more files or other data objects are to be restored using backup data stored on backup storage device 106. It is not necessary for a file being restored to have been created and/or stored previously on restoration target 104. In some embodiments, restoration target 104 is in an initial or empty state and one or more files are created and filled with information from blocks stored on backup storage device 106, e.g., as a result of having been backed up from a host other than restoration target 104. In some embodiments, a file being restored was originally stored on and backed up from restoration target 104 but (for example) becomes corrupted and is restored using the backup data.

Backup server 102, backup storage device 106, and restoration target 104 communicate via network 108. In some embodiments, an optional additional or separate connection 110 between restoration target 104 and backup storage device 106, e.g., a direct connection and/or a connection via a storage area network (SAN), is used. Connection 110 is optional and is not implemented in some embodiments. In some embodiments, information that is retrieved from backup storage device 106 is passed to restoration target 104 using connection 110 rather than network 108. Network 108 and connection 110 can be implemented using a variety of networks and connections such as a Storage Area Network (SAN) and Small Computer System Interface (SCSI). In some embodiments, the network/connection topography and/or the number of components included in backup system 100 varies from the example shown.

Efficient use of memory during a block based restoration process is disclosed. Memory is obtained, used, and/or managed in such a way that overhead associated with working with memory is reduced. For example, rather than requesting separately for each piece of information to be stored that a location in memory be allocated, e.g., by the operating system and/or a component and/or process associated with the operating system, in some embodiments memory is obtained (i.e., caused to be allocated) and the agent or process that obtained the memory manages use of the memory to perform multiple tasks each of which would otherwise have required its own memory allocation request. For example, in various embodiments the agent/process that manages access and/or use of previously allocated memory performs such functions as determining and assigning for use by itself and/or one or more other processes, as requested and/or required, unused locations in the previously allocated memory, recording or otherwise tracking location(s) in memory where information is written to, determining where in memory a given piece of information is stored when that piece of information is desired, removing or otherwise deleting tracking and/or location information associated with a given piece of information that is no longer needed or being used, etc.

In some embodiments, additional and/or alternative techniques are used to improve the performance associated with using memory. For example, rather than returning a memory after it is used to store a set of information, in some embodiments a memory is retained and is not necessarily returned or otherwise released after it is done being used for a certain purpose or operation. In some embodiments, some location or portion of a memory is sub-allocated to a subsequent backup related task (if any) once that portion or location in memory is done being used for a prior backup related task. For example, in some embodiments a memory is only released when an overall process is completed (e.g., the overall process or task of restoring objects to a restoration target is completed). In some embodiments, when retrieving from a metadata cache one or more desired pieces of metadata associated with a set of backup data, additional pieces of metadata are also retrieved where there is (for example) no determination is performed and/or no indication is received regarding whether the additional pieces of information are currently needed. These additional pieces of information are stored in cache (or other storage that is faster to access compared to the metadata store). If some of metadata stored in cache is subsequently desired or needed, it is retrieved from the cache rather than the metadata store.

Some or all of the components in block based backup system 100 may use memory in the manner(s) described above. In some embodiments, backup server 102 and/or restoration target 104 (or an agent or process running on such a component) is configured to work with memory in manner to reduce overhead associated with using memory.

FIG. 2A is a diagram illustrating an embodiment of a metadata table associated with block based backup. In the example shown, metadata table 200 includes four inode entries. An inode is associated with a file, directory, or other object on a file system and includes information used in restoring a file to a restoration target. As used herein, an inode may be associated with any operating system (e.g., UNIX or Microsoft Windows operating system) and/or any file system. In some embodiments, an inode is a unique integer identifier that the given filename is mapped to, for example internally by a file system. In some embodiments, each file (or other data object) is associated with a particular inode that has a unique inode number. For example, inodes 1-4 are associated with files A-D, respectively. File size (e.g., in bytes), permissions associated with a file (e.g., readable, writeable, etc.), block location (e.g., physical location(s) of associated blocks on backup media), and file offset (e.g., the offsets in a file that each block associated with that file is respectively written to during a restore) are stored in metadata table 200 for each inode. In this example, an inode number (e.g., inode 1, inode 2, etc.) associated with a file is used to access or otherwise retrieve information from metadata table 200 for a given file (i.e., metadata table 200 is organized according to inode number rather than, for example, file name).

Metadata table 200 is updated as appropriate to backup one or more files. For example, a new inode entry is created to reflect a new file, or file size is entered or updated to reflect the current file size. During a restore, information stored in metadata table 200 is retrieved and used in restoring a file to a restoration target. For example, to restore a file associated with inode 1, block location(s) are retrieved from the entry for inode 1. Blocks at those locations are retrieved (e.g., from backup media associated with a backup storage device) and are used to restore that file.

Metadata table 200 is updated by or in general managed by any appropriate entity and is stored on any appropriate device. In some embodiments, metadata table 200 is managed by and stored on a backup server. In some embodiments, metadata table 200 is stored on a backup storage device.

In some embodiments, information associated with metadata table 200 is stored, managed, and/or accessed in a manner to reduce overhead associated with using memory. In some embodiments a block of a memory is obtained (e.g., using a single call or procedure). Locations in memory are sub-allocated for a given restoration task, for example storing file permissions. An indication is received that the first location is available to be sub-allocation for a subsequent backup and/or restoration task, if any. In some embodiments, information associated with metadata table 200 is stored in a metadata store and when retrieving a piece of needed metadata from the metadata stored (e.g., file size, permissions, block location or other information associated with metadata table 200), additional information is retrieved adjacent in the metadata store to the needed piece of metadata. The retrieved set of metadata (e.g., including the needed and additional pieces of metadata) are stored in a cache.

Figure 2B:
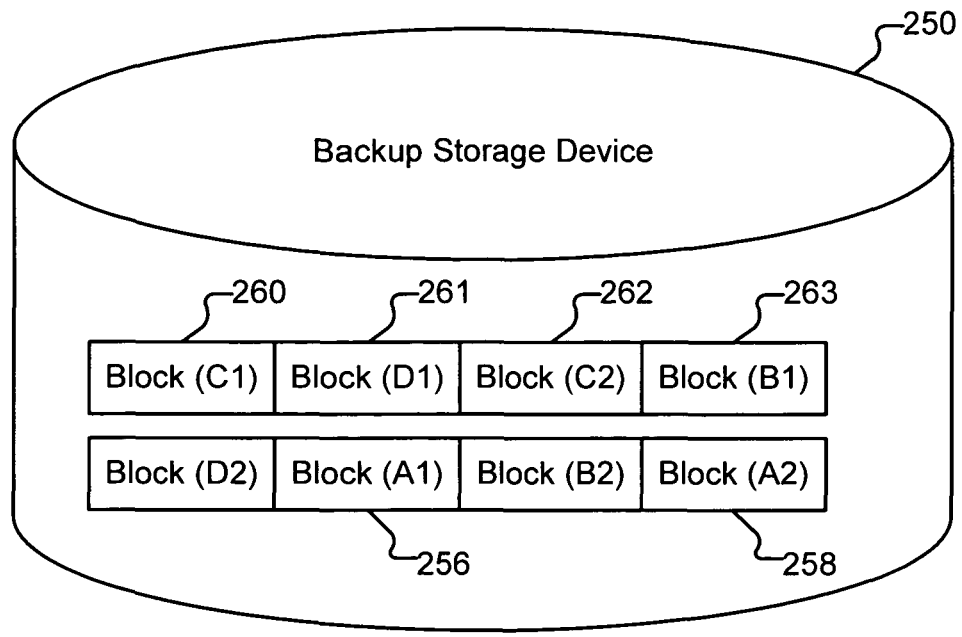
FIG. 2B is a diagram illustrating an embodiment of blocks retrieved from a backup storage device and forwarded to a restoration target.
Figure 2B:
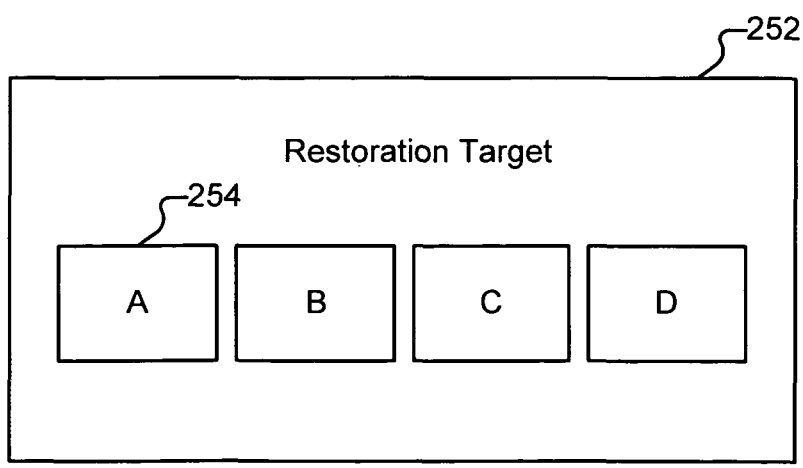

FIG. 2B is a diagram illustrating an embodiment of blocks retrieved from a backup storage device and forwarded to a restoration target. In the example shown, blocks associated with files A-D are stored on backup media associated with backup storage device 250. Blocks associated with a given file are not necessarily stored next to each other. To restore one or more files, blocks associated with the files being restored are retrieved from backup storage device 250 and are forwarded to restoration target 252. For example, to restore file A 254, blocks A1 256 and A2 258 are retrieved from backup storage device 250 and forwarded to restoration target 252. In some embodiments, the physical locations of the blocks retrieved from backup storage device 250 are obtained from a metadata table. At restoration target 252, blocks are used to restore the desired files. For example, file A 254 is created or opened and data in blocks A1 256 and A2 258 are written to the file.

In some embodiments, certain methods of retrieving or otherwise accessing information from metadata table 200 and/or backup storage device 250 are faster or otherwise more desirable than other methods. For example, when reading or otherwise retrieving information for multiple inodes from metadata table 200 it is faster in some embodiments to read them in inode number order. In some embodiments, it is faster to retrieve blocks from backup storage device 250 in block location order rather than retrieving blocks non-sequentially. In some embodiments, blocks in addition to those that are associated with a file being restored are retrieved from backup storage device 250.

Figure 3:
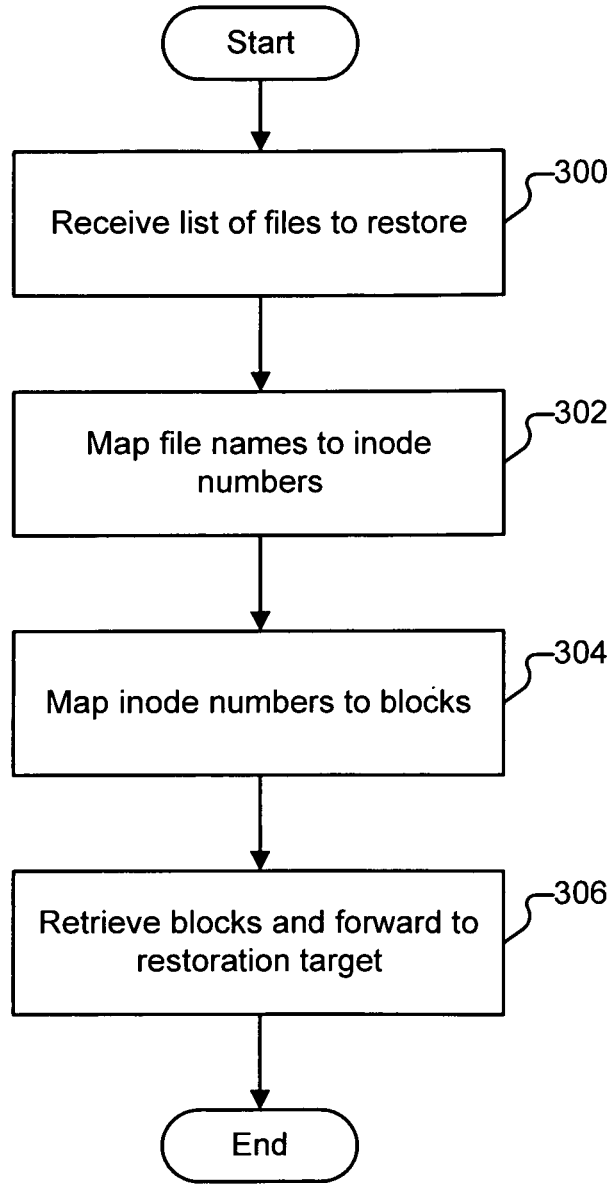
FIG. 3 is a flowchart illustrating an embodiment of a process performed by a backup server to restore one or more files on a restoration target.

FIG. 3 is a flowchart illustrating an embodiment of a process performed by a backup server to restore one or more files on a restoration target. In the example shown, block based backup is performed. In some embodiments, a client or other agent running on a restoration target and/or a backup storage device perform counterpart processing.

At 300, a list of files to restore is received. In some embodiments, a list of files to restore is received from a restoration target. In some embodiments, in addition to or as an alternative to file name, the list of names includes location with a file system hierarchy, version of the file to restore, restore settings (e.g., overwrite any existing file or restore a file while maintaining any existing version), etc.

File names are mapped to inode numbers at 302. In some embodiments, a record, table, or metadata is used to map file name to inode number. In some embodiments, such a record of file names and inode numbers is maintained by a backup server. At 304 inode numbers are mapped to blocks. In some embodiments, mapping is performed using a metadata table. Using a metadata table, the physical locations of blocks associated with the files being restored are obtained. In some embodiments, a metadata table is read or otherwise accessed in an order that reflects how inodes are stored in a metadata table. In some embodiments, a metadata table is accessed in any order. In some embodiments, only inodes entries of interest are accessed from a metadata table. For example, files corresponding to inode numbers 100, 250, 500, 700, and 800 are being restored on a restoration target. Some block backed backup systems are configured to access a metadata table only at the entries that correspond to inode numbers 100, 250, 500, 700, and 800; other entries in a metadata table are unread in systems that are so configured.

Blocks are retrieved and forwarded to a restoration target at 306. In some embodiments, additional blocks (e.g., "empty" blocks or blocks that are associated with files that are not being restored) are retrieved and/or forwarded at 306. In some embodiments, it is faster to retrieve needed blocks and some additional blocks (e.g., and discard those additional blocks later) rather than retrieve only blocks that are needed.

In some embodiments, an agent or process running on a backup server or target restore host obtains, stores information in, retrieves information from, and/or manages memory in an efficient or faster manner. For example, some backup servers are configured to obtain a block of memory from a memory allocator and sub-allocate a location or portion of the block of memory for a backup and/or restoration related task. In some embodiments, that location or portion of the block of memory is subsequently allocated (e.g., by the backup server) for another task once the first task is completed. In some embodiments, an agent or process running on a backup server stores metadata in a metadata store. An indication is received that a piece of metadata is required. In addition to the needed piece of metadata, other metadata that is not currently needed or desired is retrieved from the metadata store. The retrieved information is stored in a cache where (for example) some metadata may be retrieved from the cache should a subsequent indication be received and that metadata be stored in the cache at that time.

Figure 4:
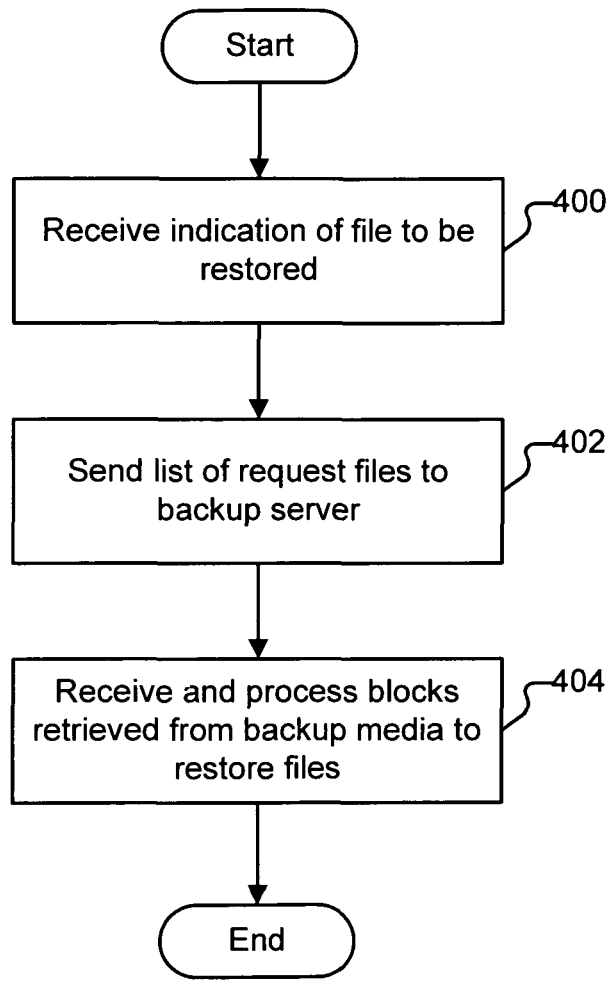
FIG. 4 is a flowchart illustrating an embodiment of a process performed by a client or agent running on a restoration target to restore one or more files on the restoration target.

FIG. 4 is a flowchart illustrating an embodiment of a process performed by a client or agent running on a restoration target to restore one or more files on the restoration target. In the example shown, a client or agent running on a restoration target is configured to interact with or otherwise communicate with a counterpart process running on a backup server and/or a backup storage device to restore one or more files on a restoration target.

At 400, an indication of files to be restored is received. In some embodiments, a user interacts with a restoration related interface to initiate a restore, select the files to be restored, select a version of a file to be restored, set restoration settings/parameters, designate restoration target(s), etc. In some applications, files being restored on a restoration target do not necessarily exist on a restoration target (e.g., a restoration target is an initial or "empty" state) and/or some files that exist on a restoration target are not being restored.

A list of files to be restored is sent to a backup server at 402. In some embodiments, an unsorted or otherwise unordered list is sent to a backup server. In some embodiments, a sorted list is sent. At 404, blocks retrieved from backup media are received and processed to restore files. In some embodiments, a contiguous group of blocks that includes at least one block that is not associated with a file to be restored is received. In some embodiments, all received blocks are associated with a file to be restored. To restore a file, in some embodiments a file corresponding to a block being processed is opened and data included in the block is written to the file at the corresponding file offset determined by the metadata table. In some embodiments, multiple blocks are needed to restore a particular file.

In some embodiments, the processing performed on a restoration target varies from the example described herein. For example, in some embodiments, a user or process interacts with a backup server to specify the files to be restored and a list of files to be restored is not sent from a restoration target.

In some embodiments, an agent or process running on a restoration target obtains, uses, and/or manages memory in an efficient manner. For example, in some embodiments, a process or agent running on a restoration target obtains memory from a memory allocator and manages sub-allocation of the block of memory for various backup and/or restoration related tasks. In some embodiments, once a location or portion of the block is done being used for one task, that location or portion is used for a subsequent task should a subsequent task exist.

Figure 5A:
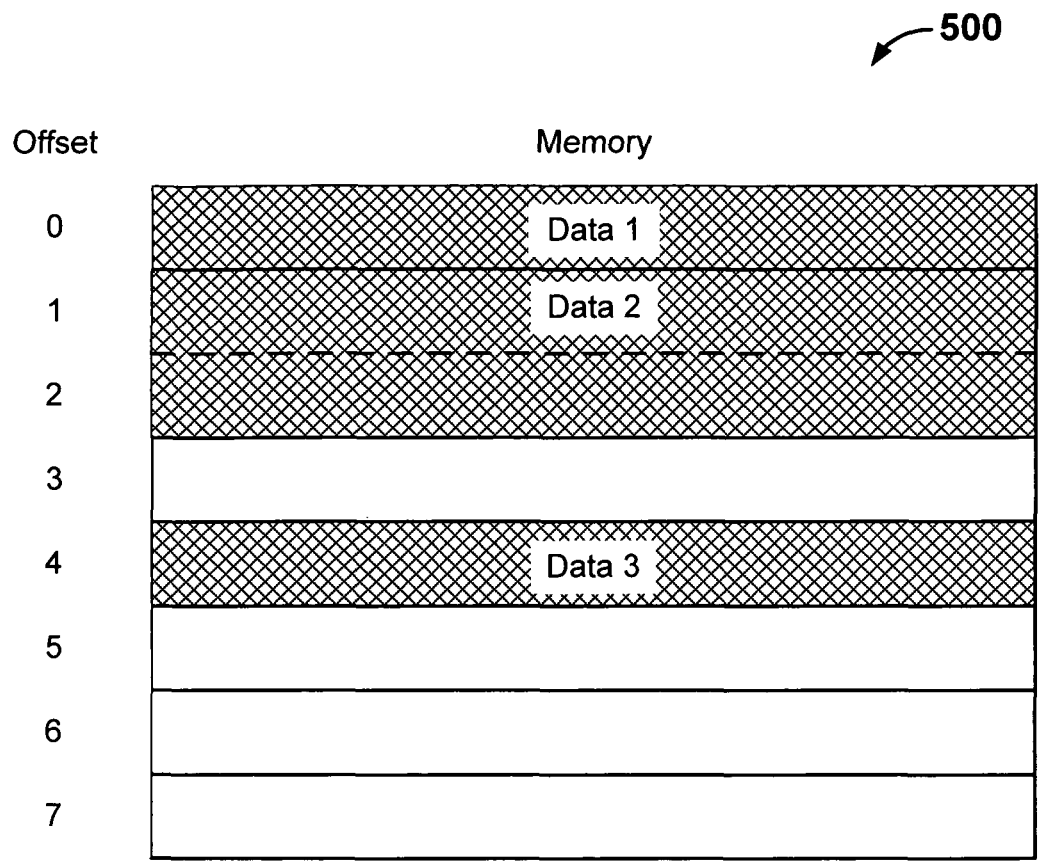
FIG. 5A is a diagram illustrating an embodiment of a memory that is obtained, written to, read from, or otherwise used in an efficient manner.

FIG. 5A is a diagram illustrating an embodiment of a memory that is obtained, written to, read from, or otherwise used in an efficient manner. In the example shown, memory 500 is allocated by an entity that has control over and/or management of memory allocation, such as an operating system or an environment or platform that a program or agent is running on. In various embodiments, the entity responsible for allocating memory varies (e.g., based on the particular embodiment) and for convenience is referred to as a memory allocator. In some embodiments, a single memory allocation call, request, procedure, or invocation (e.g., "malloc") is used to obtain memory 500. An appropriate size or amount of memory is determined in some embodiments and is passed to a memory allocator with a memory allocation call; in some embodiments a default or defined size or amount of memory is requested.

Various pieces of information (e.g., data 1-3) are stored in memory 500. Rather than invoking separate memory allocation calls for each piece of information, memory 500 is obtained in a single memory allocation call. In some embodiments, the memory that is returned in response to a memory allocation call is a contiguous block of memory in, for example, virtual or physical memory.

In some systems, performing a (e.g., single) memory allocation call is more efficient than performing multiple memory allocation calls each time, for example, a backup and/or restoration related task needs to be performed. For example, in some systems allocating a large amount of memory takes substantially the same amount of time as allocating a smaller amount of memory because of overhead. Another advantage in some systems is that the memory allocated is associated with a single, larger segment of data that is fetched or loaded when reading or writing to any portion of the larger data segment. One example of such a memory system is a page based system. If a page based system is used, memory 500 is potentially allocated from a single page and is not spread over multiple pages. If memory is allocated from a single page, a page miss is avoided when reading from and/or writing to different offsets of memory 500. Page misses result in an increased amount of time to read from or write to a given offset in memory 500. As an example of a page miss, offset 0 is accessed and is associated with a first page. Offset 7 is associated with another page and is accessed after offset 0; the new page associated with offset 7 must be fetched and/or loaded which requires an increased amount of time to access offset 7. Similar advantages in avoiding an increased access time can exist for other memory systems that do not use pages.

Since a single memory allocation call is performed and sub-allocation of the block of memory is managed by the entity that obtained the block of memory, sub-allocation of memory 500 and the locations in memory 500 where particular pieces of information are stored is managed and/or tracked. In this example, memory 500 is partitioned or otherwise segmented into smaller units at certain offsets, and each piece of information is written to an offset and uses one or more units (e.g., byte, word, double word, etc.) within memory 500. In this example, data 1 is stored at offset 0 and is 1 unit long, data 2 is stored at offset 1 and is 2 units long, and data 3 is stored at offset 4 and is 1 unit long. At offset 3 there is an empty unit that separates data 2 and data 3. Information is stored at any appropriate offset in memory 500. If additional pieces of information are received, they can be written to unused offsets within memory 500. In some embodiments, data 1-3 are associated with a particular backup and/or restoration task and memory 500 is sub-allocated within a larger block of memory. In some embodiments, there are multiple backup and/or restoration related tasks that are allocated portions of memory (e.g., each is allocation a location or portion of memory of its own similar to memory 500). In some embodiments, the tasks are independent, and one task may end before another task, etc. In some embodiments, the amount of data associated with a particular task varies over time.

In various embodiments, memory 500 is obtained at various times. In some embodiments, memory 500 is obtained before data 1-3 is obtained. A default size or amount of data is obtained from a memory allocator in some embodiments. When data 1-3 is obtained, the information is written to the already obtained memory 500. In some embodiments, data 1-3 is obtained, memory 500 is obtained from a memory allocator, and data 1-3 is written to memory 500. In some embodiments, it is anticipated that additional information will be stored in memory 500 and the amount of memory obtained is sufficient to hold data 1-3 and additional pieces of information. For example, the size of memory 500 in this example is sufficient to store some additional information.

In some embodiments, memory 500 is reused. That is, after memory 500 is no longer being used to store a certain type of information or for a certain task, memory 500 in some embodiments is not released or otherwise returned (e.g., to a memory allocator). Memory 500 and/or tracking of where information is stored on memory 500 is reset, initialized, or cleared as appropriate. For example, a table may be used to track the offsets at which data 1-3 are stored. This table may be reset to indicate that all offsets are empty so that memory 500 can be used to store another type of information and/or be used for another purpose. Should there be a subsequent task that needs memory, memory 500 is some embodiments sub-allocated to a second backup and/or storage related task once a first backup and/or storage related task is completed. In some embodiments, memory 500 is only released or returned to a memory allocator when an overall process is complete (e.g., when a restoration or a backup process is complete and there would be no subsequent tasks).

Figure 5B:
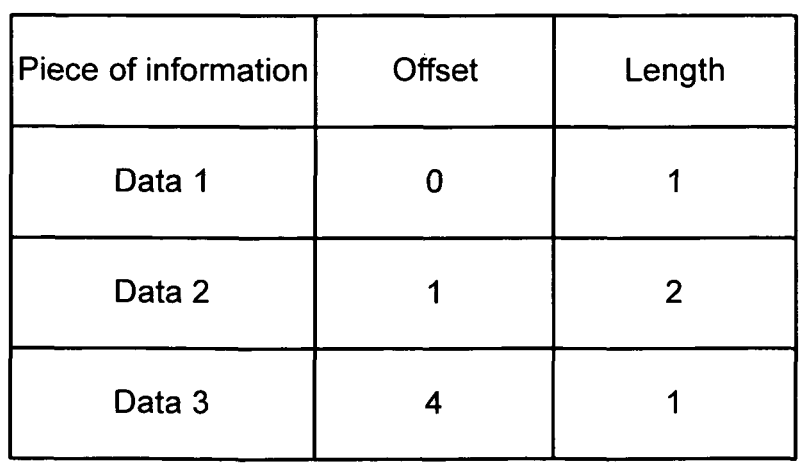
FIG. 5B is a diagram illustrating an embodiment of a tracking table used to track usage of a block of memory.

FIG. 5B is a diagram illustrating an embodiment of a tracking table used to track usage of a block of memory. In the example shown, tracking table 502 is used to track or otherwise record where information is stored in memory 500 (e.g., for a particular task for which memory 500 is sub-allocated from a larger block of memory). For each piece of information stored in memory 500, the corresponding offset and length are recorded. The entry for data 1 indicates that it is stored at offset 0 and has a length of 1 unit. Similarly, entries for data 2 and 3 indicate that they are stored at offsets 1 and 4, respectively, and are 2 and 1 unit(s) long, respectively. In some embodiments, an identifier or reference is assigned to each piece of information and the identifier is stored in the first column of tracking table 502. To obtain a piece of information from memory 500, the corresponding identifier or reference is obtained and tracking table 502 is referenced to determine the proper offset and number of units associated with that piece of information. Memory 500 is then read or accessed beginning at that offset for those number of units.

In some embodiments, tracking usage of memory is implemented differently. For example, information may be stored in a variety of data structures. Tracking table 502 in some embodiments is implemented as a file, a database, etc. In some embodiments, tracking table 502 includes entries for each offset. For example, in some embodiments, tracking table 502 has 8 entries. Entries for offsets 0 and 4 include information indicating that data 1 and 3 are stored at those offsets, respectively. Entries for offsets 1 and 2 include information indicating that data 2 is stored at those offsets. If needed, additional fields are used to indicate, for example, that the first portion of data 2 is stored at offset 1 and the second portion is stored at offset 2. In some embodiments, a piece of data is stored contiguously in memory and no additional fields are needed to specify which portion of data 2 is stored at which offset. Entries for offsets 3 and 5-7 indicate that they are empty.

In some cases, memory 500 is being used for a particular backup and/or restoration related task and fills up. In some embodiments memory 500 is maintained or kept for use by the task and additional memory is sub-allocated to augment or supplement memory 500. Tracking table 502 is modified as appropriate to reflect a additional memory. In some embodiments, a new location or portion of a block of memory that is larger than memory 500 is sub-allocated for use by a task if memory 500 should become full and memory 500 released (e.g., to be sub-allocated for use by another task).

In various embodiments, memory 500 and tracking table 502 are on various components of a block based backup system. In some embodiments, memory 500 and tracking table 502 are kept on the same physical component. In some embodiments, memory 500 and tracking table 502 are kept on different physical components.

Figure 6A:
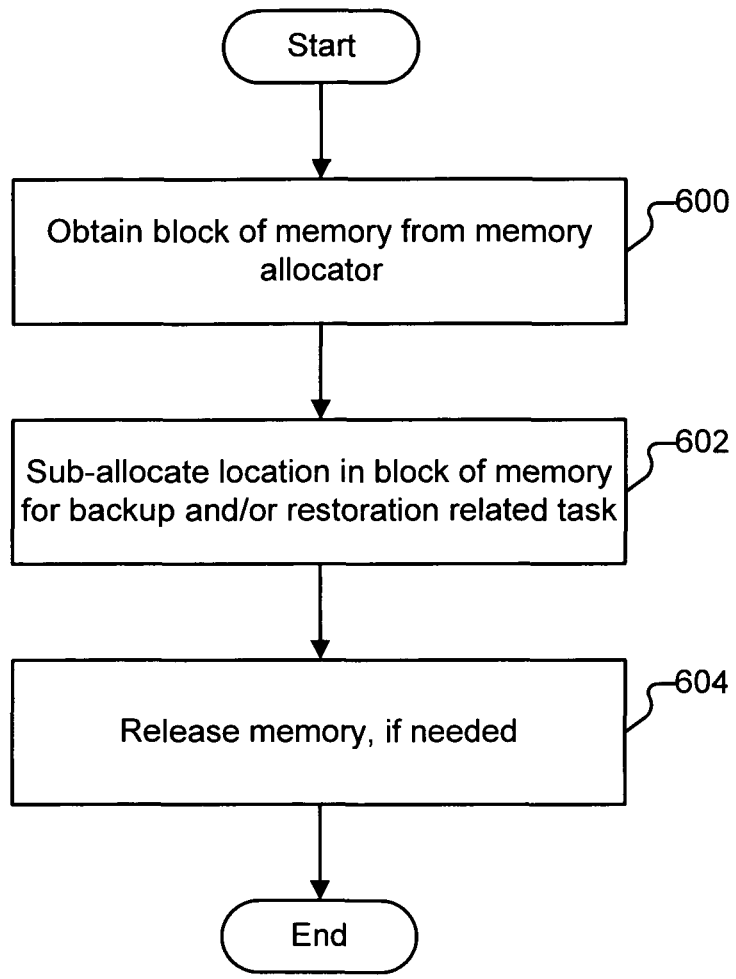
FIG. 6A is a flowchart illustrating an embodiment of a process for obtaining memory from a memory allocator and sub-allocating a location in the memory to a backup and/or restoration task.

FIG. 6A is a flowchart illustrating an embodiment of a process for obtaining memory from a memory allocator and sub-allocating a location in the memory to a backup and/or restoration task. In the example shown, memory is obtained from a memory allocator by performing a memory allocation call. A counterpart process associated with retrieving information stored in memory (e.g., in response to a request or indication for desired information) may be running independently of the illustrated process.

At 600, a block of memory is obtained from a memory allocator. In some embodiments, an amount of information to obtain is determined. In some embodiments, a default or defined amount of memory is obtained. In some embodiments, memory is obtained from a memory allocator using a single memory allocation call (e.g., a malloc call).

A location in a block of memory is sub-allocated for a backup and/or restoration related task at 602. For example, a chunk of the memory obtained from the memory allocator is allocated for use by a particular task. In some embodiments, one or more non-overlapping locations or portions of a block of memory obtained from a memory allocator are sub-allocated for various tasks. For example, a first location is sub-allocated for use by a first task, a second location is sub-allocated for use by a second task. In some embodiments, a tracking table is associated with a given location sub-allocated for a particular task. A tracking table may be used to store memory offsets and sizes for information stored in a particular sub-allocated memory. Information to be stored may be received at various times from a given backup and/or restoration task. In some embodiments, all information to be stored is obtained at one time. In some embodiments, information to be stored is obtained over a period of time.

At 604, memory is released, if needed. In some embodiments, an indication is received that a location in a block of memory that is sub-allocated for a certain task is available to be sub-allocated to another task (if any). For example, the indication may be that the first task is done using the sub-allocated location in memory. In some cases, the indication is that the first task is completed. If such an indication is received, it is helpful in some systems to release or otherwise free a block of memory that is obtained from a memory allocator. An appropriate procedure or call may be used to release memory. In some embodiments, no call is performed to release memory. For example, some automatic memory management systems perform garbage collection to automatically reclaim a block of memory that is no longer being used. In such systems it is not necessary to explicitly release memory by performing a memory release call.

Figure 6B:
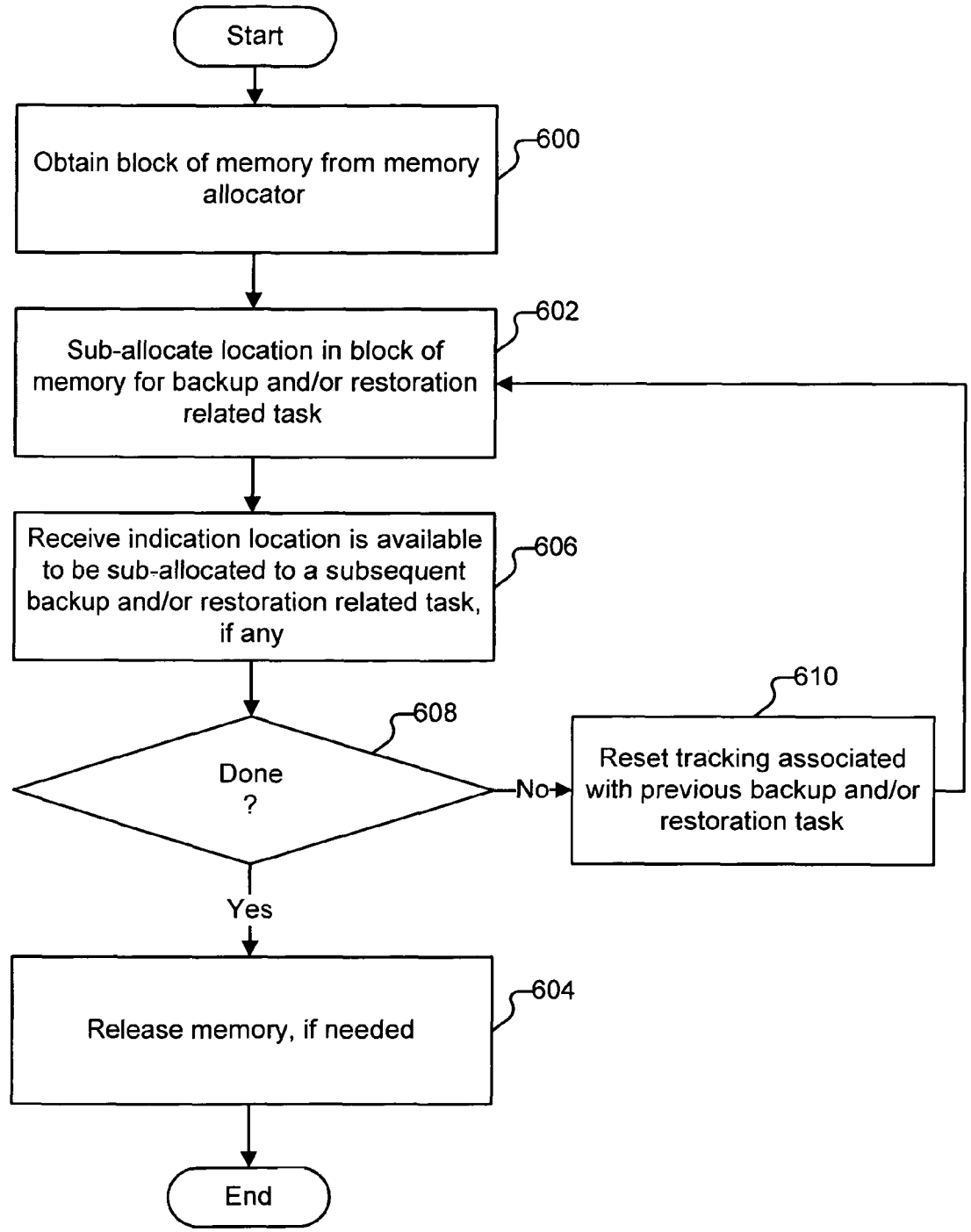
FIG. 6B is a flowchart illustrating an embodiment of a process for obtaining memory from a memory allocator and sub-allocating a location in the memory to a subsequent backup and/or restoration task, if any, once the location become available.

FIG. 6B is a flowchart illustrating an embodiment of a process for obtaining memory from a memory allocator and sub-allocating a location in the memory to a subsequent backup and/or restoration task, if any, once the location become available. In the example shown, the process is similar to that of FIG. 6A but a location or portion of memory that is sub-allocated for a first task is reused for a second task and is not necessarily released after being sub-allocated to the first task. In some embodiments, there may be some period of time between sub-allocating a location in memory to a first task and sub-allocating the same location to second task. In some embodiments (e.g., the example illustrated in FIG. 6A), memory is used or otherwise associated with a single task and is then released.

At 600, a block of memory is obtained from memory allocator. A location in a block of memory is sub-allocated for a backup and/or restoration related task at 602. At 606, an indication is received that a location is available to be sub-allocated to a subsequent backup and/or restoration related task, if any. For example, the task that has been sub-allocated a location or portion of a block of memory may indicate when it no longer needs the memory, the information stored in memory, and/or the task is completed. In some embodiments, multiple locations in memory are sub-allocated for various tasks and an indication is received for one location in particular that is available to be sub-allocated to a subsequent task.

At 608 it is decided if it is done. In some embodiments, this occurs when an overall process is done. For example, in some block based backup systems, memory is used during restoration to store metadata associated with one or more files or other data objects being restored. When all of the files are restored to a restoration target, the overall process is complete.

If it is done, memory is released, if needed at 604. Otherwise, tracking associated with a previous backup and/or restoration task is reset at 610. For example, a tracking table is reset or otherwise initialized and/or memory associated with the tracking table is erased. The state of a reset or initialized tracking table corresponds to or otherwise indicates that an associated memory is completely free or unused. In some embodiments, the memory itself is erased or otherwise set to an initial or default state. A location in a block of memory is sub-allocated for a subsequent backup and/or restoration related task at 602. For example, a memory may be reused to store a different set of information associated with a subsequent task.

Figure 7:
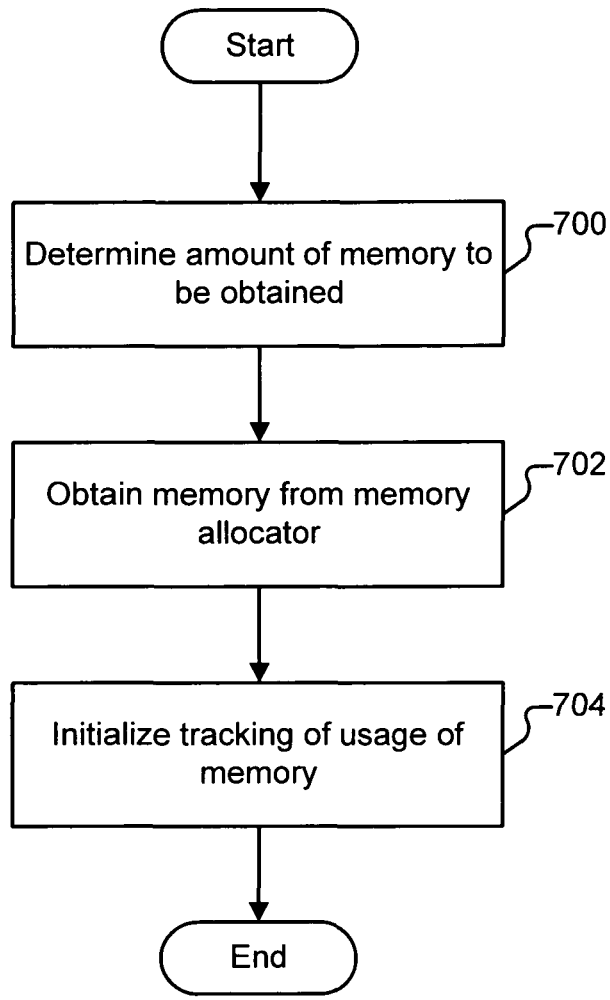
FIG. 7 is a flowchart illustrating an embodiment of a process for obtaining memory.

FIG. 7 is a flowchart illustrating an embodiment of a process for obtaining memory. In the example shown, the illustrated process is used in some embodiments to obtain memory at 600. In some embodiments, an alternative process is used. For example, in some embodiments, a default or defined amount of memory is obtained rather than determining an amount.

An amount of memory to be obtained is determined at 700. In some embodiments, some or all of the information to be stored is already obtained and the size of each piece of information and/or the number of pieces of information can be used to determine an appropriate amount of information to obtain. In some embodiments, the information to be stored is not obtained prior to determining an amount of information to obtain, but parameters or characteristics describing or otherwise associated with the information to be stored are available and are used in determining an amount of memory to obtain. In some embodiments, it is assumed or known that additional pieces of information will be stored in memory, and the amount of memory determined at 700 accounts for any anticipated or known amount of information to be stored in the future.

At 702, memory is obtained from a memory allocator. In some embodiments, a memory allocation call is performed and the amount of memory determined at 700 is passed to a memory allocator with a memory allocation call.

Tracking of usage of memory is initialized at 704. In some embodiments, tracking includes tracking which locations or portions of a block of memory are sub-allocated for particular tasks. In some embodiments, a tracking table, database, or file is used to track where a piece of information is stored in memory. If needed, a tracking table is populated or filled with values indicating that an associated memory is empty (i.e., contains no information). In some embodiments, multiple tracking tables are used (e.g., there is a tracking table for each location in a block of memory that is sub-allocated to a particular backup/restoration task).

Figure 8:
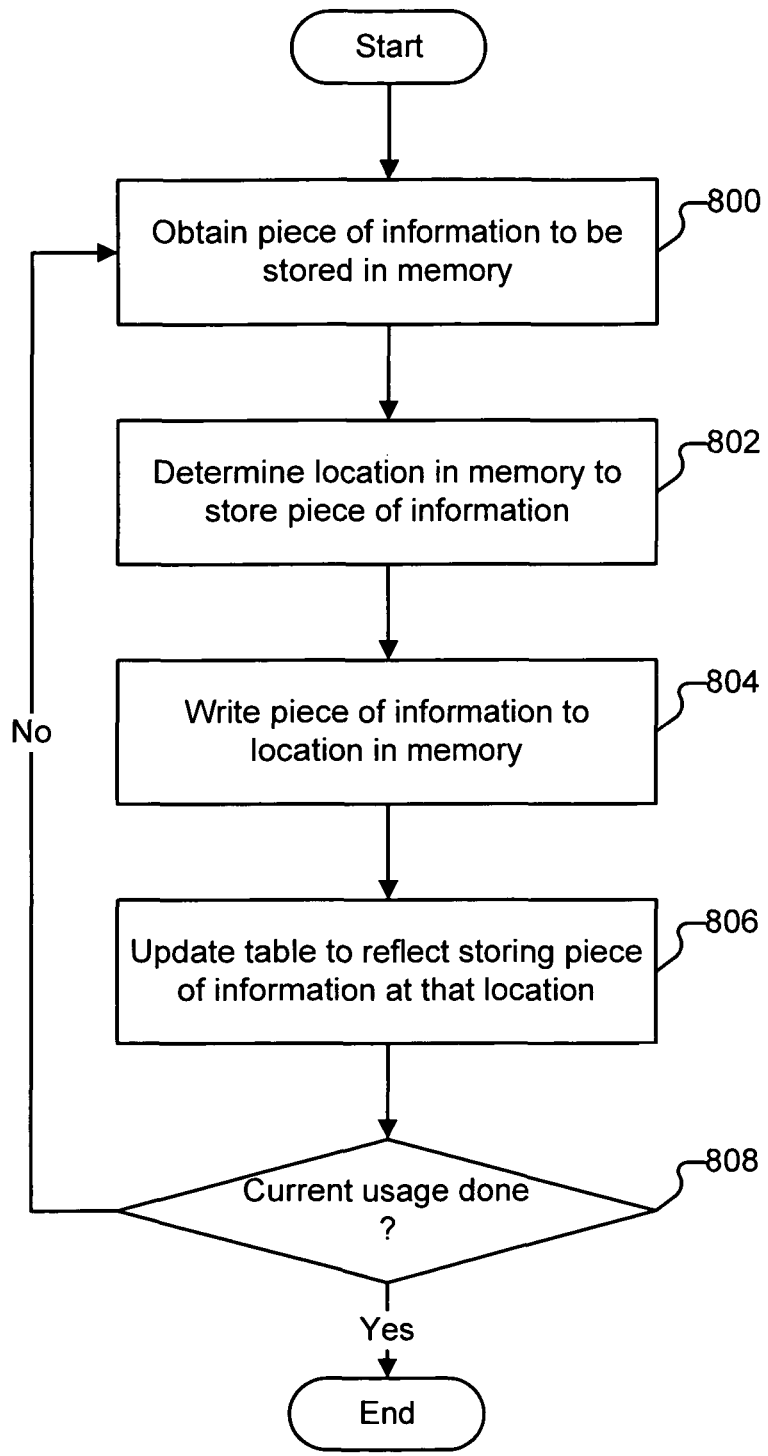
FIG. 8 is a flowchart illustrating an embodiment of a process for storing information in memory and tracking where information is stored.

FIG. 8 is a flowchart illustrating an embodiment of a process for storing information in memory and tracking where information is stored. In the example shown, the process is used in some embodiments to store and track information at 602.

At 800, a piece of information to be stored in memory is obtained. In this example, a single piece of information is stored and tracked. In some embodiments, multiple pieces of information are simultaneously processed and the illustrated process is modified accordingly.

A location in memory to store a piece of information is determined at 802. For example, a tracking table may be referenced. Using such a tracking table or other data structure, empty offsets or locations in memory are determined. In some embodiments, a piece of information is placed contiguously in (e.g., virtual or physical) memory. In systems that are so configured, a location that is sufficient to hold an entire piece of information is determined. For example, offset 3 in FIG. 5A would not be selected to store a piece of information 2 units long since there is only 1 unit of memory available. A location that comprises of offsets 5-6 or offsets 6-7 would be selected instead. In some embodiments, a piece of information is not necessarily stored contiguously in memory. As described, in various embodiments information is stored using various rules and an appropriate location determined at 802 is based on those rules. In some embodiments, related pieces of information (e.g., associated with the same file being restored, same type of information, etc.) are stored next to or relatively near each other in memory and an appropriate location is determined based on that rule and any other rules.

At 804, a piece of information is written to the location in memory. An appropriate command or call may be used to perform a write. At 806, a table is updated to reflect storing a piece of information at that location. For example, a new entry that includes an identifier associated with the piece of information, an offset, and a size is added to a tracking table.

At 808, it is decided if a current usage done. In various embodiments, a memory can be reused for other purposes or another set of information or be released. A decision outside the scope of the illustrated process may determine whether or not to reuse a memory. In some embodiments, an indication is received indicating that a current usage is done. If a current usage is not done, a piece of information is obtained at 800. The illustrated process may be repeated as many times as needed as information to be stored is obtained over a period of time.

Figure 9:
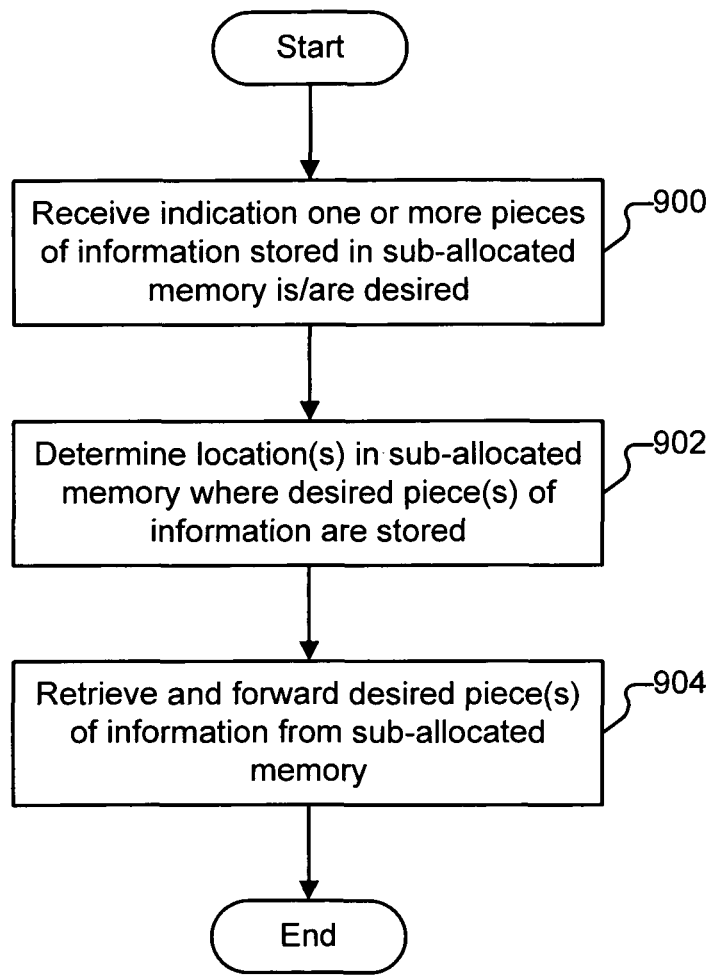
FIG. 9 is a flowchart illustrating an embodiment of a process for retrieving information stored in memory sub-allocated to a backup and/or storage related task.

FIG. 9 is a flowchart illustrating an embodiment of a process for retrieving information stored in memory sub-allocated to a backup and/or storage related task. In the example shown, a block of memory is obtained using a single memory allocation call or procedure, and some portion of that block of memory is sub-allocated to a task. Multiple pieces of information associated with a task are stored in the sub-allocated memory and their locations in memory are tracked. An entity or other source that stored information in a memory may at some point desire some or all of the stored information. The illustrated process may be used to retrieve information stored in a sub-allocated memory.

At 900, an indication that one or more pieces of information stored in sub-allocated memory is/are desired is received. For example, an indication may include references or identifiers associated with the desired piece(s) of information. At 902, location(s) in sub-allocated memory where desired piece(s) of information are stored is determined. For example, a tracking table is used in some embodiments to store memory offsets and sizes of information stored in memory sub-allocated for a certain purposed. A tracking table or other data structure may be referenced to determine where each desired piece of information is stored. Desired piece(s) of information are retrieved and forwarded from a sub-allocated memory at 904.

In some embodiments, the illustrated process operates or functions independently or in parallel to a process to store information in a memory sub-allocated to a task from a block of memory. This may be desirable in some systems where reading and writing to a sub-allocated memory are intermingled and waiting is undesirable. This may prevent one process (e.g., reading) from waiting while the other process (e.g., writing) is being serviced. Such a system may be conceptualized as a 2-port system, where one port is a read port and one port is a write port. In some embodiments, race conditions between intermingled reading and writing is a concern. For example, if a read and a write to the same piece of information are performed at substantially the same time, the data returned to the read procedure may be the old value or new value, depending upon which procedure occurred first. In such systems, a conceptual 1-port system where reading and writing are serviced by the same entity may be desirable to avoid race conditions.

Figure 10A:
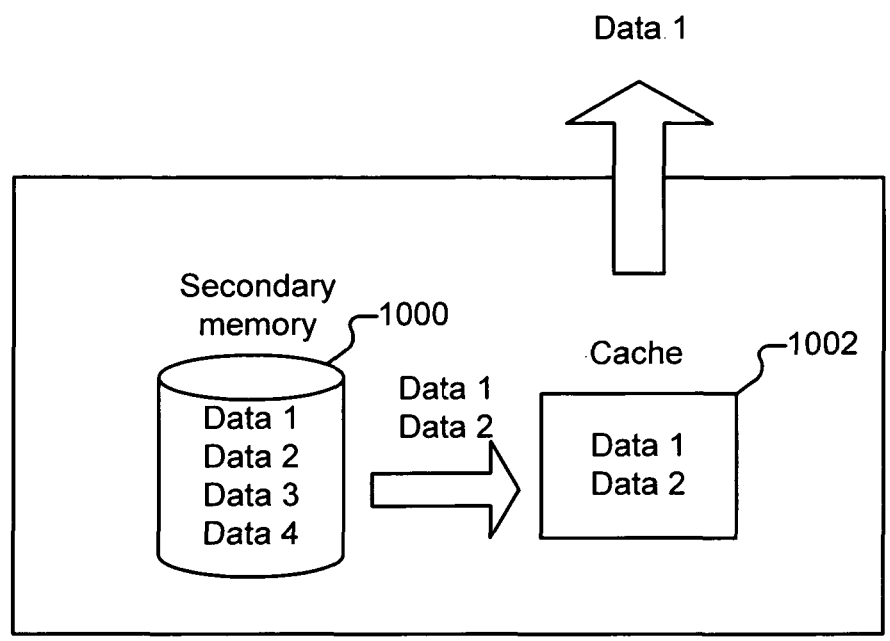
FIG. 10A is a diagram illustrating an embodiment of a desired piece of information and an additional piece of information that are retrieved from secondary memory and placed in a cache.

FIG. 10A is a diagram illustrating an embodiment of a desired piece of information and an additional piece of information that are retrieved from secondary memory and placed in a cache. In the example shown, data 1 is desired or needed (e.g., by an entity that stored data 1-4 in secondary memory 1000). In some embodiments, an indication is received that data 1 is desired or is needed. Data 2 is not requested or otherwise needed at this time. For example, an indication (if received) does not indicate that data 2 is needed at this time and/or it is not first determined that data 2 is needed before data is retrieved from secondary memory 1000.

Data 1 and 2 are stored on secondary memory 1000. Data 1 and 2 are retrieved from secondary memory 1000 and are stored on cache 1002. In some embodiments, secondary memory 1000 is a magnetic tape, hard drive, optical disk, etc. A cache in this context is defined to be some storage that is faster to read from or otherwise access compared to a secondary memory (e.g., magnetic tape or hard disk). In some embodiments, cache 1002 is a physical memory, processor cache, and/or a high performance memory. Data 1 is forwarded to the appropriate entity that requested or otherwise desired data 1. For example, metadata or other data that is stored on a secondary medium such as a hard drive or magnetic tape is retrieved and stored on, for example, physical memory so that a query for a next record will not require the access to the secondary medium, but is retrieved from physical memory.

In various embodiments, the additional data (e.g., data 2) is selected using various parameters and/or selection criteria. In some embodiments, a certain number of additional pieces of information are retrieved in addition to the desired piece(s) of information. In this example, one additional piece of information is retrieved from secondary memory 1000; in some embodiments, two or more additional pieces of information are retrieved. In some embodiments, the additional information retrieved is selected based on a piece of information's placement or location in secondary memory 1000 with respect to a desired piece of information. For example, in some embodiments, the additional piece(s) of information that is/are retrieved from secondary memory 1000 and stored in cache 1002 precedes, follows, or is otherwise adjacent to a desired piece of information in virtual or physical memory. In some embodiments, pieces of information have relationships to other pieces of information. For example, a given desired piece of information may be associated with a particular file that is being restored. In some embodiments, the additional piece(s) of information is/are also associated with that file.

Figure 10B:
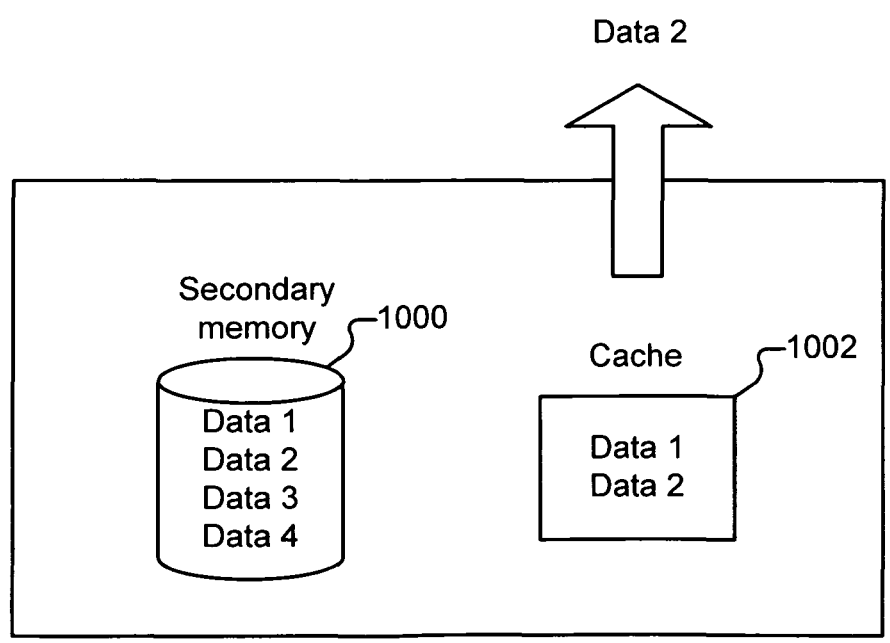
FIG. 10B is a diagram illustrating an embodiment of a desired piece of information retrieved from a cache.

FIG. 10B is a diagram illustrating an embodiment of a desired piece of information retrieved from a cache. In the example shown, some time after data 1 and 2 are stored in cache 1002, data 2 is needed. For example, an indication may be received that data 2 is needed. In some embodiments, it is first determined whether data 2 is stored in cache 1002. Since data 2 is stared in cache 1002, data 2 is read from or otherwise obtained from cache 1002 and is forwarded to an appropriate entity without accessing secondary memory 1000. Accessing cache 1002 is faster than accessing secondary memory 1000 and thus retrieving data 2 from cache 1002 is faster than retrieving data 2 from secondary memory 1000. Caching information as shown may be transparent. For example, the entity that requests or otherwise needs data 1 and 2 may be unaware of the existence or usage of cache 1002.

In some embodiments, cached information is stored and/or managed differently than the example shown herein. For example, in some applications a given piece of information will only be requested once. In some embodiments, a needed or requested piece of information (e.g., data 1) is obtained from secondary memory 1000 but is not stored in cache 1002. For example, only data 2 is stored in cache 1002. This may leave more room in cache 1002 for other information to be stored. In some embodiments, data is removed from a cache once it is retrieved from a cache. For example, after retrieving data 2 from cache 1002 in the example of FIG. 10B, data 2 may be removed from cache 1002.

In some embodiments, cached information is overwritten by other information. For example, cache 1002 is typically smaller than secondary memory 1000 and may become full. In some embodiments, some information stored in cache 1002 is selected to be overwritten and one or more decision parameters are used to make the selection. For example, some systems are configured to select the oldest piece(s) of information in a cache to be overwritten should a cache become full. Other criteria besides age may be used.

Figure 11:
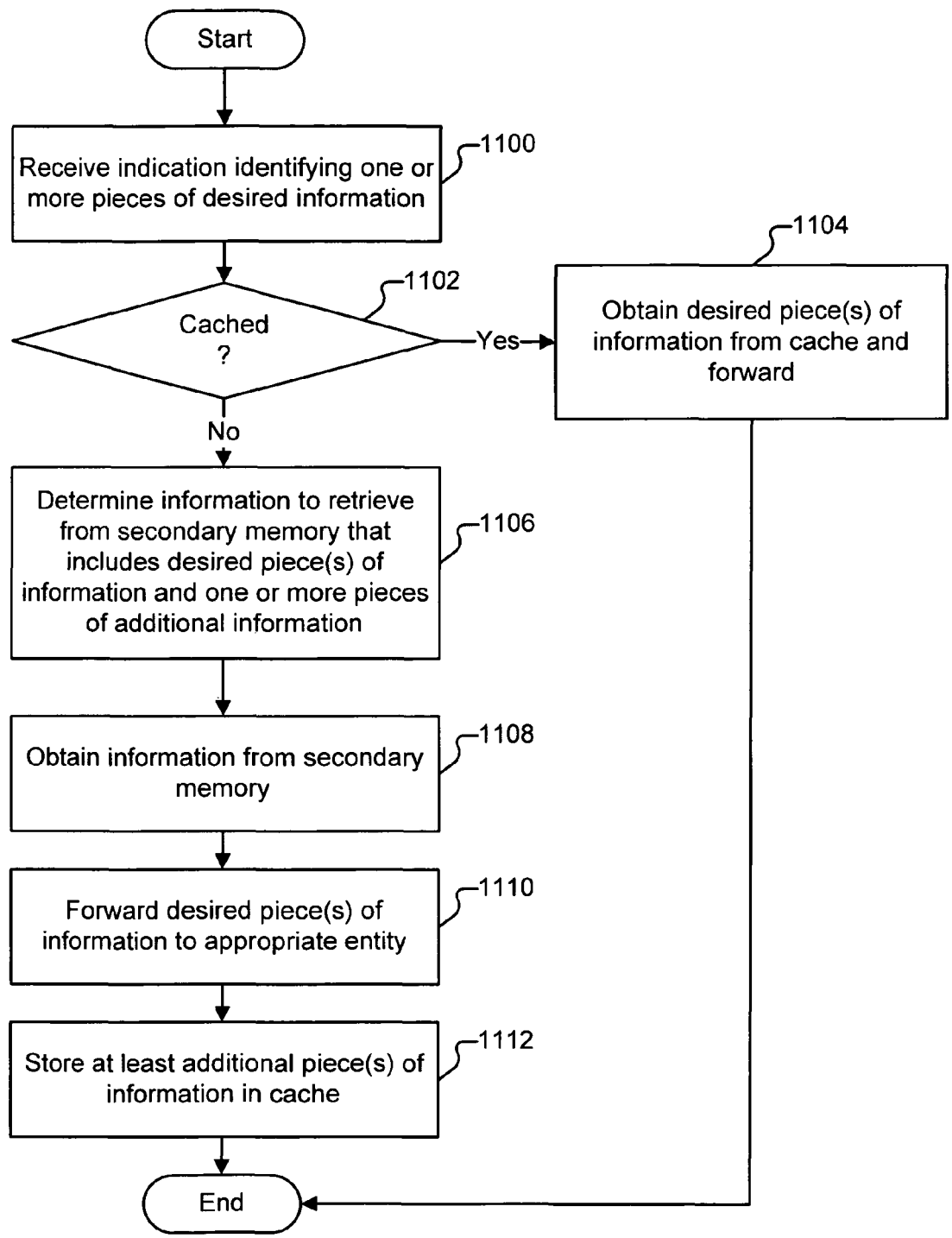
FIG. 11 is a flowchart illustrating an embodiment of a process for retrieving information, where the information is stored in a cache and/or an associated memory.

FIG. 11 is a flowchart illustrating an embodiment of a process for retrieving information, where the information is stored in a cache and/or an associated memory. In the example shown, a secondary memory has associated with it a cache that is faster to access compared to the corresponding secondary memory. A subset of information stored in secondary memory is stored in cache. The particular subset of information stored in a cache may vary over time, for example, as the cache becomes full and older information is overwritten in the cache or as cached information is needed, obtained from the cache, forwarded to an appropriate entity, and removed from the cache. In some embodiments, the illustrated process is repeated, for example as pieces of information are needed or requested over a period of time.

At 1100, an indication is received, identifying one or more pieces of desired information. In some embodiments, the desired information includes metadata records associated with a block based backup and/or restoration. It is decided at 1102 whether it is stored in a cache. Referring to the example of FIG. 10B, an indication may be received that data 2 is desired and it is determined if data 2 is stored in cache 1002.

If it is stored in a cache, at 1104 desired piece(s) of information are obtained from a cache and forwarded. In the example of FIG. 10B, data 2 is the desired information retrieved from cache 1002. In some embodiments, the desired information stored in a cache is deleted or otherwise removed from a cache after it is retrieved and forwarded at 1104.

If it is not stored in a cache, information to retrieve from a secondary memory is determined where the information includes desired piece(s) of information and one or more pieces of additional information at 1106. The additional pieces of information are not requested or otherwise needed at this point. In various embodiments, various parameters (e.g., a number of additional pieces of information to retrieve) and/or decision criteria (e.g., selecting additional pieces of information is based on where information is stored in memory, based on a relationship with a desired piece of information, etc.) are used to select the one or more pieces of additional information.

At 1108, information is retrieved from a secondary memory. In the example of FIG. 10A, the desired piece of information (data 1) and the additional piece of information (data 2) are retrieved from secondary memory 1000. At 1110, desired piece(s) of information are forwarded to an appropriate entity. For example, the desired piece(s) of information are forwarded to the entity that was the source or originator of the indication received at 1100. At 1112, the additional piece(s) of information at least are stored in cache. In some embodiments only the additional information is stored in a cache. In some embodiments, some or all of the desired information is stored in cache.

In some embodiments, if a cache is full, one or more cached items are selected to be overwritten. In some embodiments, no information is deleted or overwritten in a full cache (i.e., no new information is added to a cache once it is full). In some embodiments, minimum and/or maximum thresholds are used to determine how long to store information in a cache. For example, some systems are configured to store an item of content for a minimum amount of time and/or remove it (or make it eligible to be removed should something need to be removed) after a maximum amount of time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of using memory, comprising:
   receiving at a processor an indication of a restoration of a block-based backup of a first file;
   mapping the first file to a first inode number;
   receiving at the processor an indication that a first piece of metadata is required during the restoration, wherein the first piece of metadata is a first row of a metadata table comprising a block location for the first inode number;
   using the processor to retrieve from a metadata store a set of metadata that includes the first piece of metadata and one or more additional pieces of metadata included in the metadata store in an adjacent location that is adjacent in inode number order to the first inode number, without first determining whether the one or more additional pieces of metadata are currently required;
   forwarding the first piece of metadata to an appropriate entity; and
   storing the additional pieces of metadata in a cache.

2. A method as recited in claim 1 further comprising:
   receiving an indication that a second piece of metadata is required; and
   checking the cache to determine if the second piece of metadata is available in the cache.

3. A method as recited in claim 2, wherein receiving an indication that a second piece of metadata is required includes:
   mapping a name of a second file to be restored to a second inode number; and
   mapping the second inode number to one or more locations at which one or more blocks containing content of the file to be restored is located on backup storage media.

4. A method as recited in claim 1 further comprising:
   receiving an indication that a second piece of metadata is required;
   checking the cache to determine if the second piece of metadata is available in the cache; and
   retrieving the second piece of metadata from the cache if it is determined that the second piece of metadata is available in the cache.

5. A method as recited in claim 1 further comprising:
   determining if usage of the first piece of metadata is done; and in the event usage is done, removing the first piece of metadata from the cache.

6. A method as recited in claim 1 further comprising selecting a piece of metadata to be removed from the cache in the event the cache becomes full.

7. A system for using memory, comprising:
a processor; and
a memory coupled with the processor, wherein the memory is configured to provide the processor with instructions which when executed cause the processor to:
receive an indication of a restoration of a block-based backup of a first file;
map the first file to a first inode number;
receive an indication that a first piece of metadata is required during the restoration, wherein the first piece of metadata is a first row of a metadata table comprising a block location for the first inode number;
retrieve from a metadata store a set of metadata that includes the first piece of metadata and one or more additional pieces of metadata included in the metadata store in an adjacent location that is adjacent in inode number order to the first inode number, without first determining whether the one or more additional pieces of metadata are currently required;
forward the first piece of metadata to an appropriate entity; and
store the additional pieces of metadata in a cache.

8. A system as recited in claim 7, wherein the memory is further configured to provide the processor with further instructions to:
receive an indication that a second piece of metadata is required; and
check the cache to determine if the second piece of metadata is available in the cache.

9. A system as recited in claim 8, wherein receiving an indication that a second piece of metadata is required includes:
mapping a name of a second file to be restored to a second inode number; and
mapping the second inode number to one or more locations at which one or more blocks containing content of the file to be restored is located on backup storage media.

10. A system as recited in claim 7, wherein the memory is further configured to provide the processor with further instructions to:
receive an indication that a second piece of metadata is required;
check the cache to determine if the second piece of metadata is available in the cache; and
retrieve the second piece of metadata from the cache if it is determined that the second piece of metadata is available in the cache.

11. A system as recited in claim 7, wherein the memory is further configured to provide the processor with further instructions to:
determine if usage of the first piece of metadata is done; and
in the event usage is done, remove the first piece of metadata from the cache.

12. A system as recited in claim 7, wherein the memory is further configured to provide the processor with further instructions to select a piece of metadata to be removed from the cache in the event the cache becomes full.

13. A computer program product for using memory, the computer program product being embodied in a non-transitory computer readable storage medium and comprising computer instructions for:
receiving an indication of a restoration of a block-based backup of a first file;
mapping the first file to a first inode number;
receiving an indication that a first piece of metadata is required during the restoration, wherein the first piece of metadata is a first row of a metadata table comprising a block location for the first inode number;
retrieving from a metadata store a set of metadata that includes the first piece of metadata and one or more additional pieces of metadata included in the metadata store in an adjacent location that is adjacent in inode number order to the first inode number, without first determining whether the one or more additional pieces of metadata are currently required;
forwarding the first piece of metadata to an appropriate entity; and
storing the additional pieces of metadata in a cache.

14. A computer program product as recited in claim 13 further comprising computer instructions for:
receiving an indication that a second piece of metadata is required; and
checking the cache to determine if the second piece of metadata is available in the cache.

15. A computer program product as recited in claim 14, wherein receiving an indication that a second piece of metadata is required includes:
mapping a name of a second file to be restored to a second inode number; and
mapping the second inode number to one or more locations at which one or more blocks containing content of the file to be restored is located on backup storage media.

16. A computer program product as recited in claim 13 further comprising computer instructions for:
receiving an indication that a second piece of metadata is required;
checking the cache to determine if the second piece of metadata is available in the cache; and
retrieving the second piece of metadata from the cache if it is determined that the second piece of metadata is available in the cache.

17. A computer program product as recited in claim 13 further comprising computer instructions for:
determining if usage of the first piece of metadata is done; and
in the event usage is done, removing the first piece of metadata from the cache.

18. A computer program product as recited in claim 13 further comprising computer instructions for selecting a piece of metadata to be removed from the cache in the event the cache becomes full.

* * * * *